Patented Oct. 18, 1927.

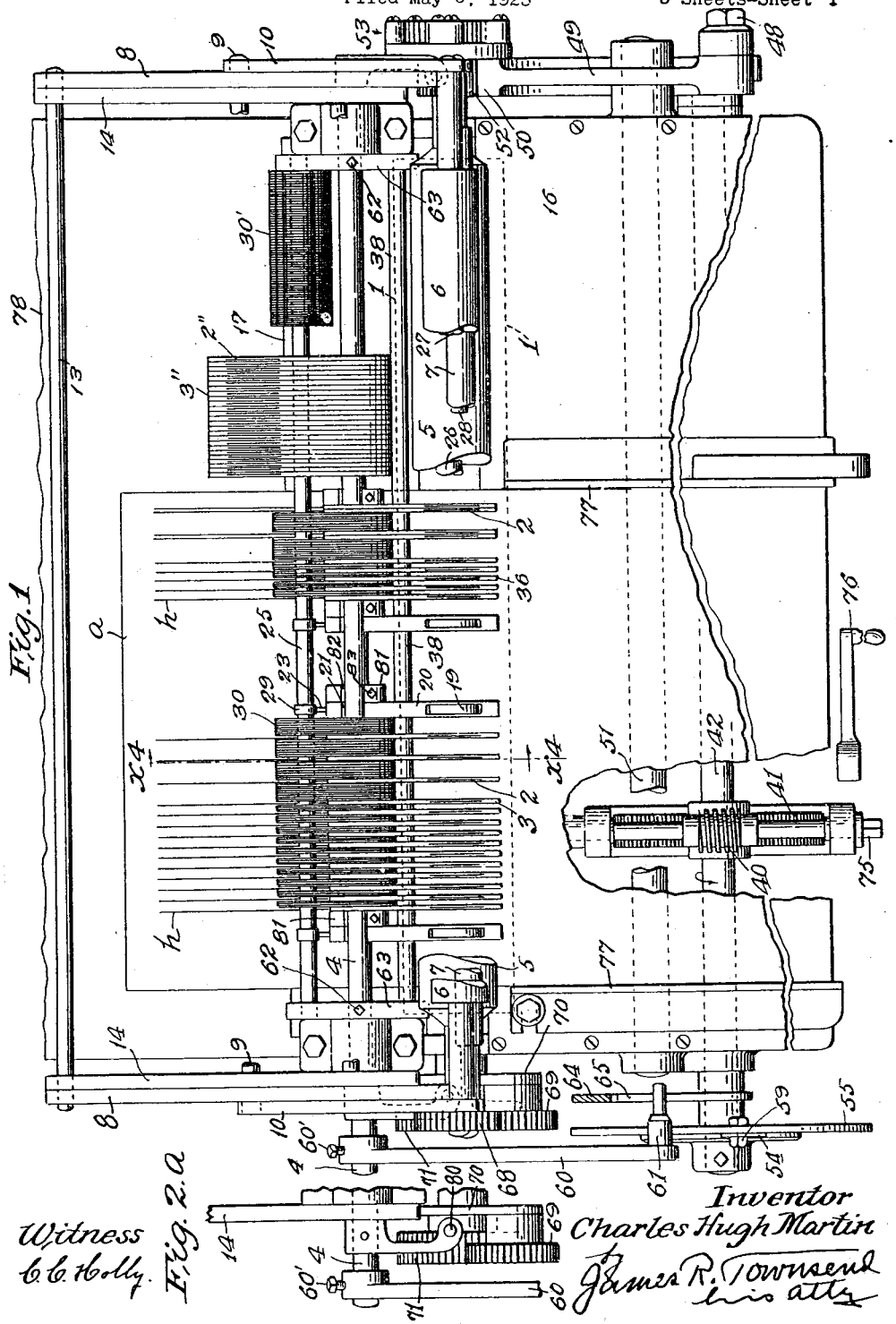

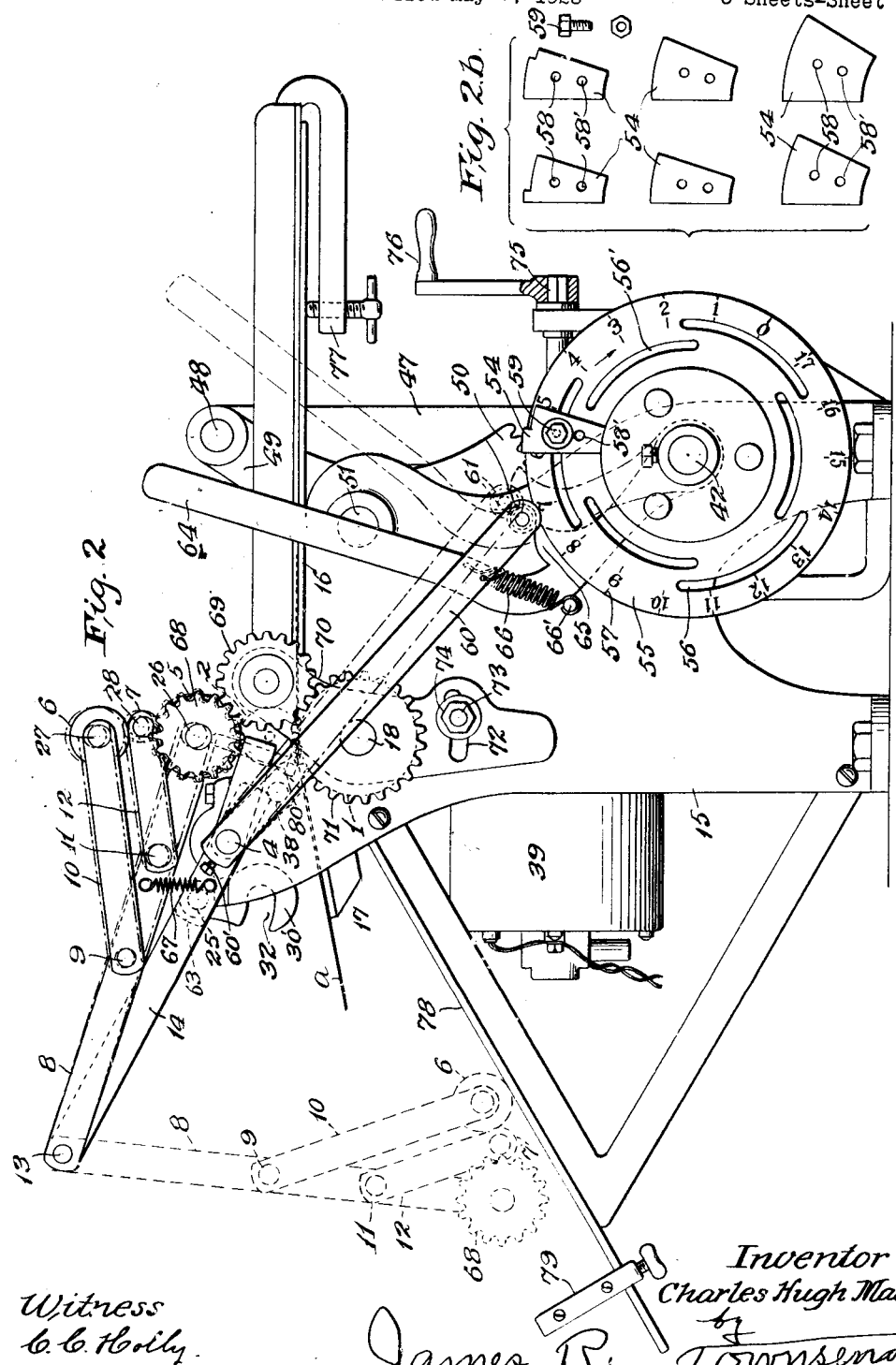

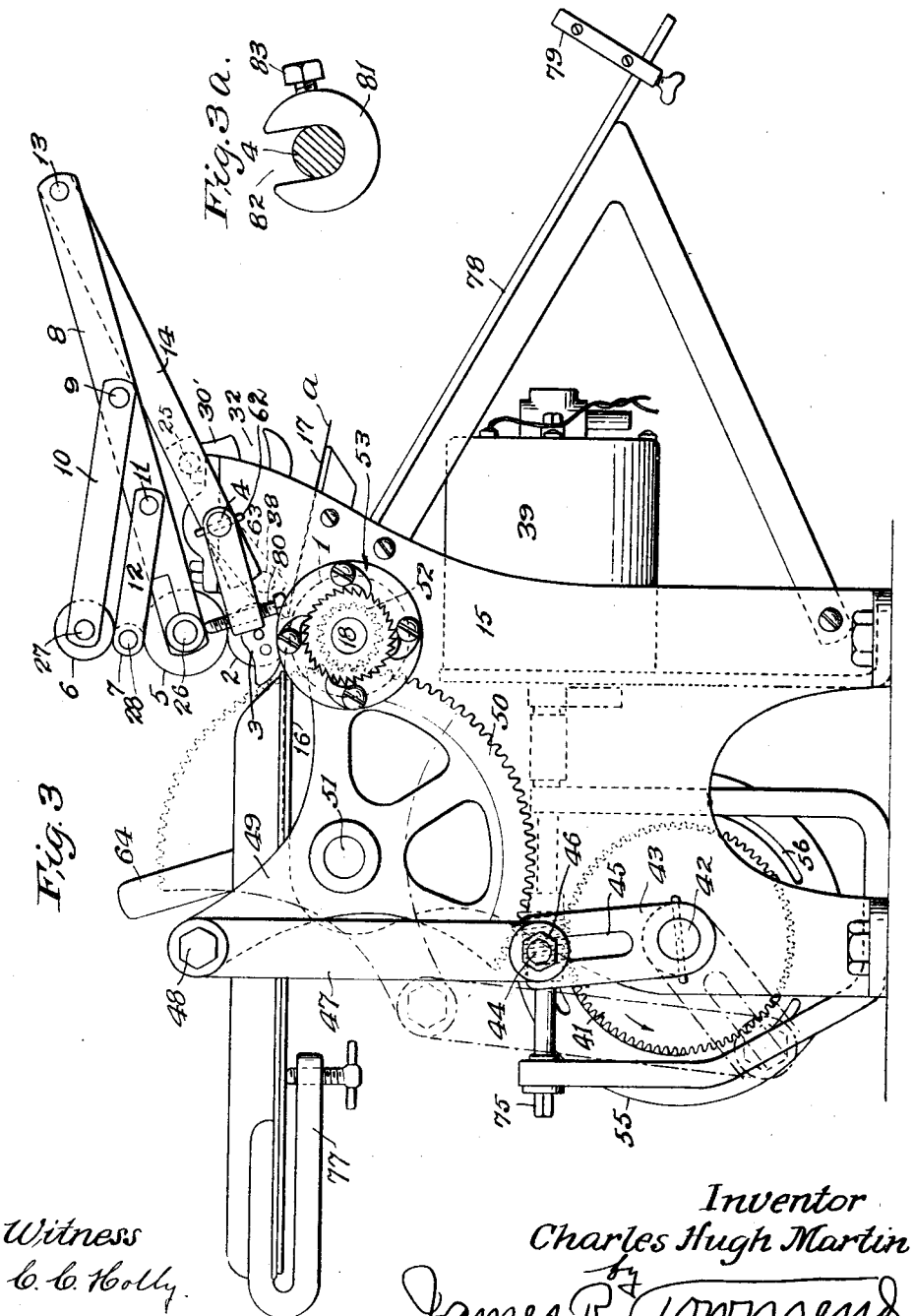

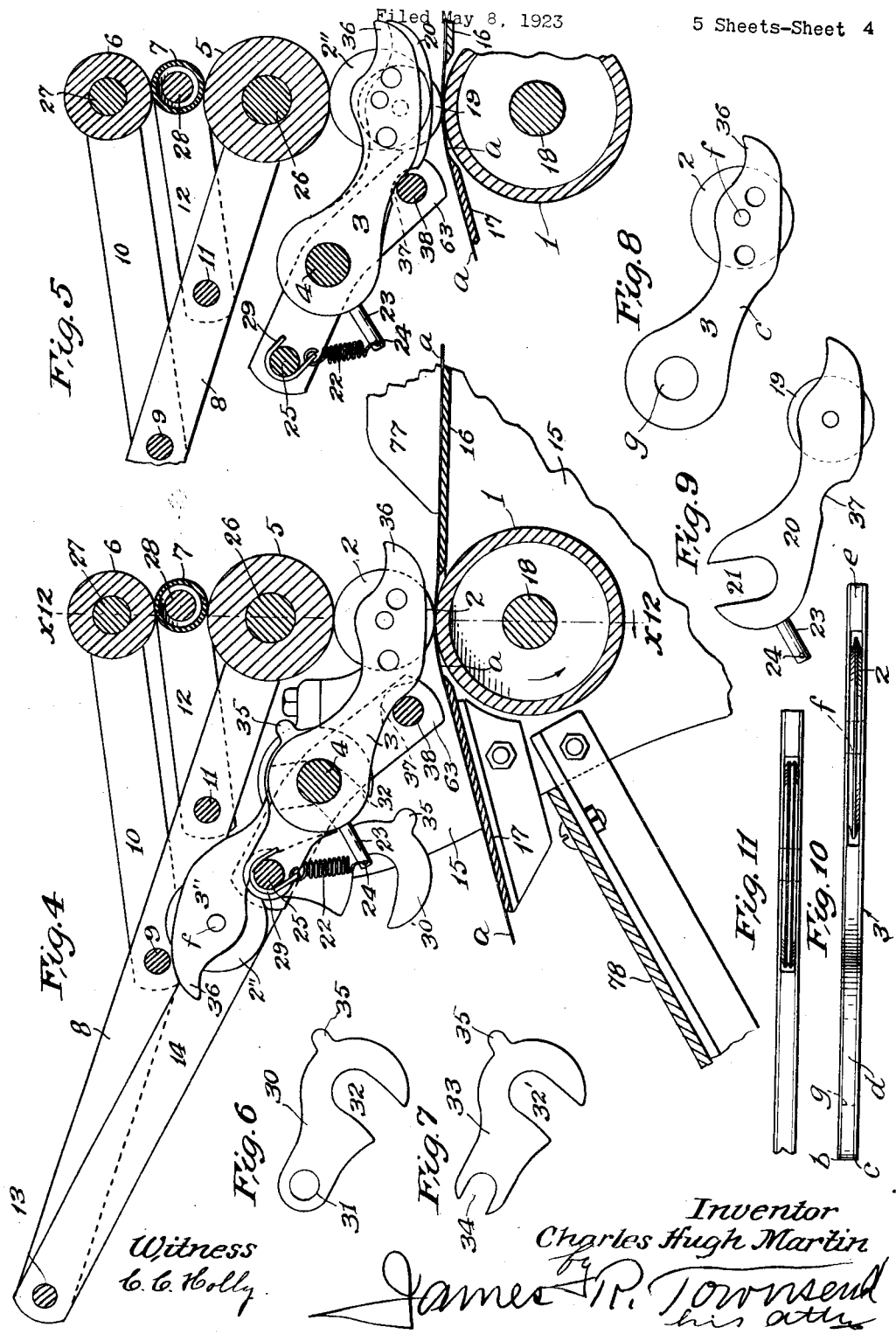

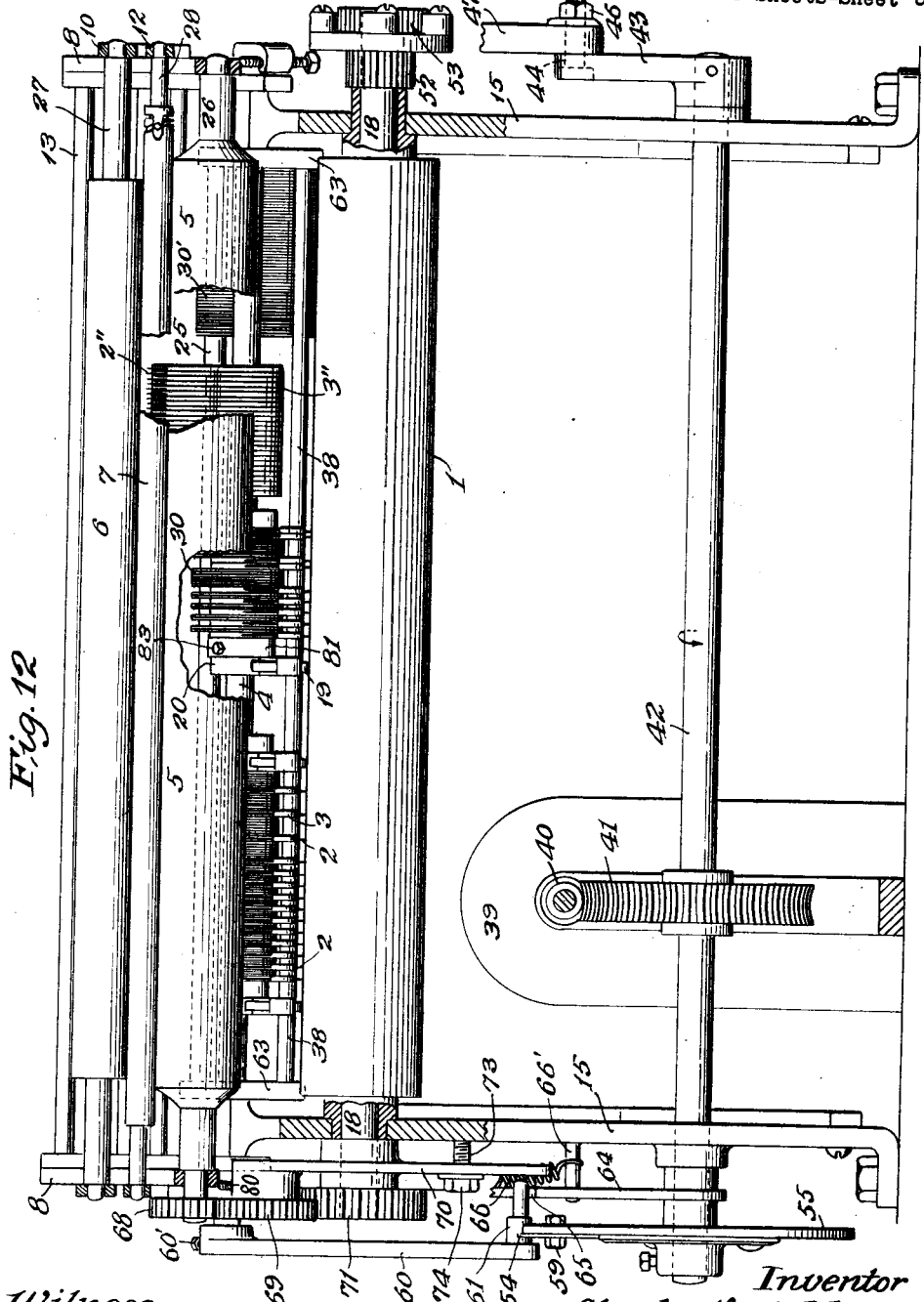

1,646,206

UNITED STATES PATENT OFFICE.

CHARLES HUGH MARTIN, OF LOS ANGELES, CALIFORNIA, ASSIGNOR OF ONE-HALF TO ANGELO FREDIANI, OF LOS ANGELES, CALIFORNIA.

RULING MACHINE.

Application filed May 8, 1923. Serial No. 637,418.

This invention relates to machines adapted for ruling parallel straight lines upon flat sheets.

An object of the invention is to make provision whereby the beginnings and ends of the lines may be determined with a high degree of accuracy, so as to register with horizontal lines adjusted to horizontal spaces, provided, or to be provided, upon such sheets.

A further object is to provide a machine of this character which can be quickly and accurately adjusted to any length of line and to any width of space between lines, both laterally and endwise.

Another object is to make provision for a machine of this kind which will automatically operate to effect the result for which it has been set.

So far as I am aware, machines adapted to rule lines upon flat surfaces have heretofore been constructed with pens arranged to deliver fluid ink to the surface to be ruled; and such pens are only adapted to the use of fluid inks and they are subject to injury from the friction of the paper or other material which is drawn under the pens.

With the pen ruling machines, the work of adjusting the pens to the required service is very difficult and requires the attention of a highly skilled workman owing to various conditions such as various degrees of pressure on the pens, different stiffness of pens and different adjustments of the pens toward and from the surface to be ruled.

An object of this invention is to avoid all such difficulties and to make it possible for an ordinary workman to make all adjustments.

An object of this invention is to eliminate such frictional wear as might interfere with the accuracy of ruling so that a machine when once set to a certain job will continue accurate work indefinitely without further attention, until the job is finished.

I have discovered that it is practical to effect such ruling by means of disks inked with printers' ink and this invention is broadly new, basic and pioneer in that I have provided rotary disks for the ruling of flat surfaces.

An advantage gained by providing ruling disks instead of ruling pens is the ease of setting the machine to the desired ruling spaces.

An object of the invention is ease and accuracy of setting the machine with respect to both width of space and length of line.

In this respect the invention is broadly new, basic and pioneer in that I have provided a disk and a disk holder therefor, the latter being pivotally mounted above a table on an axis that is parallel to the table surface, and means for holding the disk in position to contact with a table supported surface to be ruled, and with means adapted to ink the edge of the disk.

I have also provided means to hold the disk out of ruling position and I make the disk holders and disks thin and flat and mount any desired number of said disk holders on a common axis, and provide spacers whereby the disk holders, and consequently the disks may be spaced apart as desired.

Other objects of the invention are simplicity and cheapness of construction and ease of assembly and adjustment.

An object of the invention is to so construct the line ruling elements of the machine as to allow them to be made from stampings united in a simple and inexpensive manner such as by rivets and electric spot welding.

Other objects, advantages and features of invention may appear from the accompanying drawings, the subjoined detail description and the appended claims.

The accompanying drawings illustrate the invention.

Figure 1 is a fragmental plan of a ruling machine constructed in accordance with this invention. Parts are broken out to expose parts that would otherwise be hidden and the front edge of the table is shifted to contract the view.

Fig. 2 is an elevation of the left hand side of the machine shown in Fig. 1; there being a single skip cam in place on the skip wheel.

Fig. 2ª, Sheet 1, is a fragmental detail showing parts exposed when the inking device is thrown back as indicated by broken lines in Fig. 2.

Fig. 2ᵇ, on Sheet 2, is a view of a complement of skip cams and their bolts therefor, detached.

Fig. 3 is an elevation of the right hand side of the machine shown in Figs. 1 and 2.

Fig. 3ª is a detail of the lock washer on rod 4.

Fig. 4 is a fragmental sectional elevation on line $x^4-x^4$, Fig. 1, showing the machine operating to rule a sheet.

Fig. 5 is a fragmental sectional elevation showing the position of parts either when thrown off or when skipping.

Fig. 6 is a side view of one of the regular spacers detached.

Fig. 7 is a side view of one of the auxiliary spacers detached.

Fig. 8 is a side elevation of one of the regular ruling elements detached, including a disk and a disk holder.

Fig. 9 is a side elevation of one of the pressure rollers to hold the sheet in contact with the sheet supporting and driving cylinder.

Fig. 10 is an enlarged top view of the regular ruling element shown in Fig. 8.

Fig. 11 is an enlarged fragmental top edge view of a multiple line ruling element.

Fig. 12 is a fragmental elevation in section on line $x^{12}-x^{12}$, Fig. 4, the gears, rollers and rods being left intact.

The sheet supporting and driving cylinder 1 is preferably made of steel and has a perfectly smooth, ground and polished peripheral surface constituting means to support the sheet $a$ as it passes beneath the ruling disks 2 which are opposed to the sheet supporting means, and are journalled in the disk holders 3, that are oscillatably mounted on the horizontal disk holding rock shaft rod 4, so that by gravitational means they may be individually moved into commission or ruling position, as shown at 2 at the right of the rod 4 in Fig. 4; and out of commission or operative position as at 2″ at the left of said rod 4 in said Fig. 4. Each disk 2 or 2″ and its holder 3 constitutes a line ruling element. Thus each disk is entirely independent from every other one and need not be adjusted with relation to any other. The disks may be of slightly different diameters and still make a perfectly ruled sheet, since each one rests on the paper independently of every other. This makes for simplicity of adjustment and uniformly accurate work. Also it will be seen that each disk is automatically compensated for wear.

When one or more disks are in ruling position as shown at 2 in Fig. 4, the inking roller 5 is brought into position to rest upon the top edges of the disks so that by such means they are collectively held in commission or operative position; and during the operation of the disks 2, they are inked by the inking roller 5, to which the ink is distributed in the usual way by the rollers 6 and 7, that are pivotally connected to the inking roller arm 8 by the pivot 9 and arm 10 for roller 6, and the pivot 11 and arm 12 for roller 7; said inking roller 5 being pivoted by axis 13 to a support 14 fixed to the frame 15 that supports the sections 16, 17 of the table top, and in which frame the shaft 18 of the cylinder 1 is journalled.

The sections 16, 17 of the table top are spaced apart from the cylinder 1 so that the produced surfaces of the table sections are tangent to the crown of the cylinder as clearly seen in Fig. 4. The sections are also at an angle from the horizontal, so that the paper feeds better, and without a tendency to wrinkle under the disks.

Rollers 19 are mounted in position to rest upon the sheet $a$ to be ruled, and to hold said sheet against the cylinder 1, thus to insure that the cylinder will carry the sheet through the machine. Said rollers 19 are mounted in adjustable roller holders 20 provided with bearings formed by slots 21 spaced from said rollers 19 and adapted to receive the rod 4 upon which the disk holders 3 are oscillatably and slidably mounted.

Yielding means are arranged to press the rollers 19 down upon the sheet $a$ to be ruled, to hold said sheet friction tight upon the cylinder 1; and such means are shown as a spring 22 connected to a stud 23 projecting from the roller holder 20 underneath the slot 21; and the spring 22 is secured to the stud 23 by any suitable means, as by inserting the end of the spring through a hole 24 in said stud, and detachably connecting it with a horizontal spacer supporting rod 25 that is carried by the rear ends of arms 63 of rock shaft 4, and extends in parallelism with the rods or shafts 4, 18, 26, 27 and 28, the cylinder 1, and the inking and distributing rollers 5, 6 and 7. The springs 22 are shown provided with hooks 29 to hook upon the rod 25 behind the rod 4 upon which the disk holders 3 and the roller holders 20 turn.

The inking rollers 5, 6 and 7, may be removed from the disks 2 and the sheet contacting friction producing rollers 19, by swinging the arms 8 up from the solid line position, over, back and down to the hanging position shown by the broken lines in Fig. 2, so that any or all the disks and the friction rollers are free to be adjusted alternatively into and out of contact with the sheet as desired.

The regular or permanent spacers 30, are swung on the rod 25 and are arranged to be thrown back to rest on the rod 25 and allowed to hang down when not needed as indicated at 30′ in Figs. 1, 4; and the disk holders 3 are arranged to be slid aside when not required for ruling and swung back to rest on rod 25 as shown at 3″, Figs. 1 and 4.

The rod 25 is carried by the rear ends of arms forming a yoke 63 which is fixed to the rock shaft 4 by taper pins 62; and a skipping rod 38 extending transversely beneath the disk holders and roller holders that are in active position, is fixed to the front end of the yoke so that by rocking the shaft 4, the disks and rollers may be lifted from or lowered onto the sheet a to be ruled.

The parts are constructed and arranged to allow the rod 38, at one position, to leave the rollers and disks free to rest on the surface to be ruled and to allow said rod, when slightly raised, to act on the disk holders to lift the disks from such surface, and, upon a further upward movement of rod 38, to also lift the rollers. These movements of the rod are effected by rock and shaft 4 and its yoke 63.

The ruling disks and the holders therefor may be constructed in any desired way. Said disks are thin edged as indicated at 2 in Fig. 10, and the holders 3 may be made of two side pieces b, c, spot-welded or otherwise fixed to center pieces d and e; the disks 2 being mounted upon axles f riveted to the side pieces b, c.

The regular disk holders are provided with holes g at their ends opposite the disks and are slidably strung upon the rod 4 and held apart thereon by spacers 30 that have holes 31 at one end by which they are slidably strung upon the spacer rod 25. Said spacers are provided at their freely swinging ends with lateral slots 32 adapted to accommodate, hook upon, and freely slide along, the rod 4 upon which the disk holders are strung. The sides of the disk holders 3, and spacers 30 are flat and fit closely together so as to hold the disks 2, true. The holders and spacers are slidable along their respective rods so that they may be brought to any position desired.

In addition to the permanent spacers 30, removable supplemental spacers 33 are provided, each having a lateral slot 32′ corresponding to the lateral slot 32 in the permanent spacers, and provided with a rear end slot 34 adapted to accommodate and fit upon the rod 25 so that the spacers of this character can be detachably inserted wherever desired, to appropriately space the disk holders and their disks. Each of the spacers is provided with a knob 35 by which it can be handled.

When the permanent spacers 30 are not in use, they may be swung over from the rod 4 and allowed to hang down as seen at 30′ in Fig. 4; and when the disks are not in use, they may be caught by their tips 36 and swung back to rest upon the rod 25 as shown at 26″ in Fig. 4. Detachable friction pressure roller holders 20 may perform the office of spacers as well as that of holding the rollers that press the paper down on cylinder 1. Said roller holders 20 are recessed at their lower edges as at 37 to accommodate a disk lifting skip rod 38 which is carried by rock arms 63 that are fixed to and extend forwardly from the rod 4 to cause it to act upon the disk holders 3 to lift the disks 2 from the sheet a for the purpose of simultaneously terminating the ruling by all disks in operation. In Fig. 5 said skip rod 38 is shown in disk lifting position, the roller 19 being shown still in contact with the sheet a so that the revolution of the cylinder advances the paper, thus causing the disks to skip a space.

It is thus seen that when the skip rod 38 is down, as in Fig. 4, the friction rollers 19 and the ruling disks 2 contact with the sheets a, and the friction thus produced between the sheet and the cylinder is sufficient to advance the sheet; and the disks operate to transfer the ink from the inking roller 5 to the sheet; and when the skip rod 38 is lifted slightly it acts upon the disk holders 3 to lift the disks 2, thus stopping the ruling operation without disturbing the rollers which still serve to afford such friction of sheet upon cylinder as to advance the sheet as the cylinder revolves.

The cylinder shaft 18 and the mechanism co-operating therewith and with the cylinder 1 are driven by any suitable power, as by electric motor 39 through worm 40, worm wheel 41 and power shaft 42 which is connected at one end by intermittent motion mechanism comprising crank arm 43 with crank pin 44 adjustable thereon by slot 45 and nut 46; connecting rod 47; pin 48; radius arm 49 of toothed segment 50 oscillating on shaft 51 through pinion 52 and well known ratchet mechanism 53 to operate the cylinder at each revolution of the power shaft 42, through an amplitude of rotary movement determined by the radial position of the pin 44. The cylinder operating mechanism just described is old and well known and constitutes no part of my invention.

Referring to Fig. 2 the skipping cam 54 projects beyond the rim of the graduated cam wheel 55 that is fixed to the power shaft 42 and is shown provided with cam holding arcuate slots 56, 56′, and with graduations 57.

The arcuate slots are of different radii and the cams are each provided with bolt holes 58, 58′ at a slightly greater distance from the outer ends of the cams than the distance between the slots, respectively, and the circular rim of the cam wheel.

One or more cams may be used and the slots overlap so that any cam may be disposed at any desired position on the wheel and secured by a bolt 59, so that it will actuate the skip bar 60 as the cam passes the same.

The tappet ends of the cams may be of different lengths and the operator will arrange the cams on the skip wheel so as to lift and lower the bar 60 as may be desired to end and begin the ruled lines h.

The skip bar 60 is shown provided on one side with a roller 61 which is long enough to extend across the path of any number of cams that may be stacked and secured on the side of the skip wheel.

The rear end of the skip bar is fixed by suitable means as the set screw 60' to the rod 4 which constitutes a rock shaft to which there are fixed, by suitable means, as the tapered pins 62, the rock arms 63 that carry the skip rod 38 which extends under the disk holders 3 and roller holders 20.

The construction and arrangement of the means just described is such that when a cam passes the skip bar and lifts the roller, the disks are lifted and held from the sheet *c* for the exact period of cam passage, thus instantly terminating the ruled lines when the cam lifts, and again instantly continuing the ruling at the moment the cam leaves the skip roller.

The throw-off lever 64 is journaled on the power shaft 42 and is provided with a cam 65 adapted to lift the skip roller 61 when the throw-off lever 64 is pulled forward, and to free said roller when the throw-off is thrown back. A spring 66 is fixed at one end to a stud 66' which also serves as a rest for the retracted throw-off lever 64 as shown in Fig. 2; said spring 66 is connected to the skip lever 60 above said stud 66' to draw said lever down to hold the skip roller in contact with the periphery of the cam wheel 55 and in contact with the cams 54 as they pass beneath the roller, thus making the operation of lifting the rolling disks instantaneous. The cam finger 65 is shaped so as to lift the roller 61 sufficiently to not only lift the disks from the sheet but also to lift the friction rollers 19 when the throw-off lever is fully moved forward. The spring 67 is arranged to hold the inking roller firmly down upon the disks. Said inking roller is driven in the usual manner by a toothed wheel 68 meshing with the idler 69 that is carried on the adjusting arm 70 and meshes with the toothed wheel 71 that is fixed to the cylinder shaft 18 which forms the center upon which the arm 70 oscillates.

Said arm 70 is provided with a slot 72 to accommodate a bolt 73 which is fixed to the frame 15 and is fitted with a tap nut 74 by which the arm 70 is made stationary when the idler is adjusted to cooperate with the toothed wheel 68 when the inking roller has been brought into engagement with the tops of the disks.

The worm shaft is provided with arm 75 on which a crank 76 may be detachably applied to turn the parts to a desired adjustment before starting the machine. 77 indicates an adjustable gage clamped onto the table to direct the paper to pass under the inking mechanism. Such gages may be placed in any position and the machine is adapted to rule one or more sheets of any width within the limits of the table's width. It is also adapted to rule a continuous sheet drawn from a paper roll, not shown.

The delivery table 78 is provided with the usual barrier 79 to hold the ruled sheets stacked on the table.

A set screw 80 is provided to limit the thrust of the inking roller 5 under the tension of the spring 67.

Locking collars 81 having slots 82 to receive the rock shaft 4, and having set screw 83 to fix the collar on said rock shaft, are provided to hold the spacers and disk holders in the final assembly position to effect the ruling.

The adjustment and operation of the machine will be understood from the foregoing description.

Before the machine is put into operation, the set screw 80 will be adjusted to allow the appropriate pressure of the roller upon the disks; the inking apparatus will be swung back out of the way as indicated in the broken lines in Fig. 2, and the attendant will adjust the disk holders, spacers, rollers and spacing clamps to the required work and will also apply to the skip wheel such cams and length of tappet as may be required to determine the space between the ends of the lines. The operator will lay copy on the table and arrange the ruling disks to correspond in position to the lines on the copy and will swing the permanent spacers into appropriate position, and where additional spacers are required, will insert the temporary spacers; and when all the parts are thus adjusted he will apply the locking collars 81 to hold the assembly, and will tighten the set screws 83.

When all the parts are ready for operation of the machine, the stack of sheets may be placed on the front section 16 of the table in the usual way, and the sheets may then be fed one by one in the ordinary way to run beneath the disks and rollers; or if it is desired to rule a continuous strip of paper, this may be done by feeding the paper in a well known manner from a roller, not shown.

I claim.

1. In a ruling machine, the combination with a supporting surface, and an inking roller and means for supporting said inking roller relative to said surface, of a shaft in parallelism with the inking roller, supporting means for the shaft, a ruling disk operable between said surface and the inking roller; and disk holders slidably mounted on the shaft and adapted for holding the disks in and out of operating position.

2. A ruling machine comprising a cylinder adapted to support and drive a sheet, a sheet supporting surface, a shaft parallel to the cylinder, an inking roller and means for supporting said inking roller relative to said surface, ruling disks on said shaft adapted to rule such sheets, and rollers interposed between said disks for holding the sheet in frictional contact with the cylinder.

3. In a ruling machine, ruling disks, oscillating means to which such disks are journaled; and oscillating means adapted to operate on said first oscillating means to alternatively hold said disks respectively in and out of ruling position during the ruling operation.

4. In a ruling machine, the combination with a cylinder adapted to support a sheet, of a shaft parallel to the cylinder; disks; oscillatable means on the shaft and adapted to hold the disks respectively in and out of position above the cylinder; and a roller adapted to apply ink to the edges of the disks above the cylinder.

5. In a ruling machine, the combination with a cylinder adapted to support a sheet; of a shaft parallel to the cylinder; disks; means oscillatable on the shaft and adapted to hold the disks respectively in and out of position above the cylinder; and means having a sheet contacting surface adapted to hold the sheet in frictional contact with the cylinder.

6. In a ruling machine, the combination with a cylinder adapted to support a sheet, of a shaft parallel to the cylinder; disks; means oscillatable on the shaft and adapted to hold the disks respectively in and out of position above the cylinder; means adapted to apply ink to the edges of the disks above the cylinder; a roller having a sheet contacting surface adapted to hold the sheet in frictional contact with the cylinder; supporting means in which said roller is journalled, and means adapted to lift the disks from the sheet while the roller is on the sheet.

7. In a ruling machine, the combination with a cylinder, of a shaft parallel to the cylinder; supporting means in which said shaft is journalled; disk means oscillatable on the shaft and movable respectively in and out of position above the cylinder; an inking roller; and oscillatable means on said shaft to support the inking roller above the disks.

8. The combination with a supporting surface, and an inking roller; of a shaft in parallelism with the inking roller; supporting means in which said shaft is journalled, a ruling disk adapted to operate between said surface and the inking roller; and disk holders slidable along the shaft and adapted to adjustably hold the disks in and out of operating position.

9. The combination with a sheet supporting cylinder, and an inking roller, of a shaft in parallelism with said cylinder and roller; supporting means in which said shaft is journalled; disks adapted to operate between said cylinder and roller; and disk holders slidable along the shaft and adapted to adjustably hold the disks in and out of operating position.

10. The combination with a sheet supporting cylinder, and an inking roller, of a shaft in parallelism with said cylinder roller; supporting means in which said shaft is journalled; disks adapted to operate between said cylinder and roller; disk holders slidable along the shaft and adapted to adjustably hold the disks in and out of operating position; and means whereby the inking roller is so supported that it can be swung out of the way to leave the disks and their holders free to be moved out of and into operating position.

11. A ruling machine of the character described, comprising an inking roller, disks adapted to operate between a sheet supporting surface and the inking roller, a shaft; said disks being slidably and oscillatably mounted on the shaft between said surface and roller, means to support the shaft; the combination of means to move the sheet transversely to the inking roller; and means timed with the sheet moving means to move the disks out of and into position for contacting with the sheet.

12. The combination with an inking roller and a sheet supporting and driving cylinder; of a rock shaft; supporting means in which said shaft is journalled; disks; holders for said disks respectively; said holders being oscillatable on said rock shaft; means operable by said rock shaft to raise and lower the disk holders; operating means for said rock shaft, and means connecting said cylinder and operating means for actuating the latter.

13. In a ruling machine having ruling disks and means for inking such disks; a rock shaft; supporting means in which said shaft is journalled; disk holders oscillatable on the rock shaft; arms fixed to, and projecting from opposite sides of the rock shaft; and rods carried by said rock shaft, and operable with the rock shaft and adapted to support the disk holders out of ruling position.

14. In a ruling machine having ruling disks and means for inking such disks, and means to support a sheet to be ruled; a rock shaft; supporting means in which said shaft is journalled; disk holders oscillatable on the rock shaft toward and from said support; arms fixed to, and projecting from opposite sides of the rock shaft; rods carried by and operable with said rock shaft and adapted to support the disk holders out of ruling position; rollers; roller holders for said rollers; and resilient means to operate said roller holders toward said sheet support irrespective of the position of the disks.

15. In a ruling machine having ruling disks and means for inking such disks, and means to support a sheet to be ruled; a rock shaft; supporting means in which said shaft is journalled; disk holders oscillatable on the rock shaft toward and from said support; arms fixed to, and projecting from opposite sides of the rock shaft; rods carried by and operable with the rock shaft and adapted to support the disk holders out of ruling position; rollers; roller holders for said rollers; and resilient means to operate said roller holders toward said sheet support irrespective of the position of the disks; the disk supporting means being at one position, adapted to lift the disks from the surface to be ruled, without lifting the rollers, and at a further position to lift the rollers from such surface.

16. A ruling machine provided with an inking roller and a rod in parallelism therewith; and ruling elements strung on said rod and adapted to be slid therealong and also to be swung about said rod; said roller being adapted to be swung into and out of engagement with said elements.

17. A ruling machine provided with an inking roller and a rod in parallelism therewith; ruling elements strung on said rod and adapted to be slid therealong and also to be swung about said rod; said roller being adapted to be swung into and out of engagement with said elements; and spacers slidable on said rod to space apart the ruling elements.

18. A ruling machine provided with a cylinder and ruling elements; frames disposed adjacent said cylinder; a rod on which said frame elements are strung; said rod extending transversely of the machine so that the ruling elements may be spacially adjusted along the rod and transversely of the machine.

19. A ruling machine provided with a cylinder; ruling elements adjacent said cylinder; a frame and a rod on which said elements are strung; said rod extending transversely of the machine so that the ruling elements may be spacially adjusted along the rod and transversely of the machine; and spacers having slots to receive said rod and adapted to be applied to and remove from said rod to maintain the spacial adjustments of said ruling elements.

20. A ruling machine comprising a frame for supporting spaced apart table sections, and a cylinder the top of which is between said sections; the produced planes of the top surfaces of said sections being tangent to the top of the cylinder; ruling elements supported above said cylinder; and means for intermittently causing said ruling elements to contact with a sheet to be ruled when the same is passed over the cylinder.

21. A ruling machine comprising a table formed in two sections in angular relation spaced apart, and a cylinder, the top of which is between said sections; the produced planes of the top surfaces of said sections being tangent to the top of the cylinder; and ruling elements adapted to contact with a sheet to be ruled when said sheet passes over the cylinder.

22. A ruling machine comprising a table formed in two sections spaced apart, and a cylinder, the top of which is between said sections; the produced planes of the top surfaces of said sections being tangent to the top of the cylinder; ruling elements adapted to contact with a sheet when said sheet passes over the cylinder; of a rock shaft; operating means for said rock shaft; and means connecting said cylinder and operating means for actuating the latter.

23. A ruling machine comprising ruling elements having disks to contact with a moving sheet, friction rollers interposed between said disks, and an inking roller; an arm on which said inking roller is mounted adapted to be brought into position to rest upon the top edges of said disks to ink the same.

24. A ruling machine having ruling elements comprising disks and a cylinder adapted to be revolved below the disks to move a sheet to be ruled; and friction rollers interposed between said ruling disks adapted to hold the sheet against the cylinder; and means for supporting and ruling disks and friction rollers relatively to the cylinder.

25. A ruling machine having ruling elements comprising disks and a cylinder adapted to be revolved below the disks to move a sheet to be ruled; friction rollers adapted to hold the sheet against the cylinder; a cam wheel; means to rotate said wheel; and means joining said wheel and said disks to intermittently lift the disks from ruling position; and means for supporting the ruling disks and friction rollers relatively to the cylinder.

26. In a ruling machine the combination with sheet supporting means comprising a cylinder; roller holders; rollers carried thereby to press a sheet friction tight upon the cylinder; a rod; means to support said rod; said roller holders being mounted to oscillate on the rod and provided with studs respectively; and springs connected to said studs and operating to hold the rollers toward the cylinders.

27. In a ruling machine having ruling elements, which elements comprise sharp edged disks and holders therefor, means for supporting said ruling elements, said holders consisting of thin side pieces fastened to each other and spaced apart to accommodate the disks between them; said disks being journaled between such side pieces; and detachable elements adapted for location between the ruling elements to maintain the spacial adjustment of said ruling elements.

28. A ruling machine provided with a rod and an inking roller, and with disks adapted to transfer ink from the roller to a surface to be ruled; disk holders, said holders being pivotally mounted on said rod; some of said holders being journalled on the rod and others of said disks being detachable from the rod, and detachable spacers on the rod to space the disks apart.

29. In a ruling machine the combination with a cylinder and ruling elements and friction rollers adapted to act upon a surface to be ruled, a skip rod engaging said elements and rollers and operable simultaneously with the cylinder and adapted and arranged to first lift the elements and upon further movement, to lift the rollers.

30. In a ruling machine the combination with a cylinder and ruling elements and friction rollers adapted to act upon a surface to be ruled, a skip rod engaging said elements and rollers and operable simultaneously with the cylinder adapted to first lift the elements and upon further movement, to lift the rollers; and means operable to operate the skip rod.

31. The combination with the sheet supporting and driving cylinder; of means to operate the cylinder intermittently; disks for ruling a sheet driven by the cylinder; operating means for the rock shaft; and means connecting said cylinder and operating means for actuating the latter.

32. The combination with a frame having a sheet supporting and driving cylinder journalled therein; of means to operate the cylinder intermittently; disks for ruling a sheet driven by the cylinder; a cam wheel operable simultaneously with the cylinder; said wheel being adapted to hold one or more cams; means whereby the cam movement operates the disks simultaneously to lift them from the surface to be ruled; and detachable cams of different widths to cause the disks to be elevated from the sheet at different places.

33. In a ruling machine having a frame having a sheet supporting and driving cylinder, and disks for ruling a sheet; a cam wheel operable simultaneously with the cylinder; said wheel having arcuate slots; cams of different length for said wheel; bolts to extend through the slots to fasten the cams to the wheel; and means operable by the cams to intermittently lift the disks to cause skips in ruling.

34. In a ruling machine having a frame having a sheet supporting and driving cylinder, and disks for ruling a sheet, a cam wheel operable with the cylinder; said wheel having arcuate slots; cams of different lengths for said wheel; bolts to extend through the slots to fasten the cams to the wheel; means operable by the cams to lift the disks to cause skips in the ruling; and a lever to cause such skipping independently of the cams.

35. In a ruling machine having a frame having a sheet supporting and driving cylinder, and disks for ruling a sheet, a cam wheel operable simultaneously with the cylinder; said wheel having arcuate slots; cams of different lengths for said wheel; bolts to extend through the slots to fasten the cams to the wheel; and means operable by the cams to lift the disks to cause skips in the ruling; and a lever to cause such skipping independently of the cams; said slots overlapping and said cams being adapted to be combined to give greater or less length of skip action, as required.

36. In a ruling machine, the combination with a frame provided with a sectional table, of a sheet driving cylinder having a shaft journalled in the frame between the table sections, a rock shaft journalled in the frame above the cylinder, ruling disk holders carrying ruling disks mounted on said rock shaft, inking rollers journalled in said frame above said ruling disks, frictional rollers adapted for location between said inking disks, yokes connected to the rock shaft, a supporting rod on said frame for the spacing members, a skipping rod connected to said yokes, and means for actuating the skipping rod to first lift the ruling disks and upon further movement to lift the friction rollers.

37. In a ruling machine, the combination with a frame provided with a sectional table, of a cylinder provided with a shaft journalled in the frame between the table sections, a rock shaft journalled in the frame above said cylinder, ruling elements and friction rollers carried by said rock shaft and adapted to act upon a surface to be ruled, yokes secured to said rock shaft, a skipping rod connected to said yokes, said skipping rod adapted to first lift the elements and upon further movement to lift the rollers, and means for intermittently actuating the said skipping rod.

38. In a ruling machine, the combination with a frame provided with a sectional table, of a cylinder having a shaft journalled in the frame between the table sections, a rock shaft journalled in the frame above said cylinder, disk holders pivotally mounted on said rock shaft, disks carried by said holders, and means for holding the disks in position to contact with said table supported surface to be ruled.

39. In a ruling machine, the combination with a frame provided with a sectional table, of a cylinder having a shaft journalled in the frame between the table sections, a rock shaft journalled in the frame above said cylinder, disk holders pivotally mounted on said rock shaft, disks carried by said holders, means for holding the disks in position to contact with a table supported surface to be ruled, and means to hold the ruling disks out of ruling position.

40. In a ruling machine, the combination with a frame provided with a sheet supporting table, of a sheet moving cylinder having a shaft journalled in the frame between the table sections, a rock shaft journalled in the frame above said cylinder, disk holders pivotally mounted on said rock shaft, marking disks carried by said holders, means for holding the disks in position to contact with the table supported surface to be ruled, and means operable with the cylinder for intermittently lifting the disks to cause skips in the ruling.

41. In a ruling machine, the combination with a frame provided with a sheet supporting table, of a sheet moving cylinder having a shaft journalled in the frame between the table sections, disk holders pivotally mounted on an axis parallel to the table surface, inking disks carried by said holders, means for holding the disks in position to contact with the table supported surface to be ruled, means operable with the cylinder for intermittently lifting the disks to cause skips in the ruling, and a lever adapted for actuation to cause independent elevation of the ruling disks.

42. In a ruling machine, the combination with a cylinder, of ruling elements each comprising a disk adapted for contacting with a sheet moved by said cylinder, a frame in which said disks are mounted, means for actuating said frame, and means for inking said disks.

43. In a ruling machine, the combination with a cylinder, of ruling elements each comprising a disk contacting with a sheet moved by said cylinder, a frame in which said disks are mounted, a rod, supporting means for said rod, and an inking means for said disks adjustably mounted on said rod.

44. In a ruling machine, ruling elements, each element comprising a disk contacting with a moving sheet, a frame in which said disk is mounted, a rod, means supporting said rod, said frames being each pivotally mounted on said rod, and means to variously space said frames along said rod.

In testimony whereof, I have hereunto set my hand at Los Angeles, California, this 30th day of April, 1923.

CHARLES HUGH MARTIN.